March 26, 1974     U. HOPPE     3,799,969
UREA DERIVATIVES
Filed Sept. 1, 1971
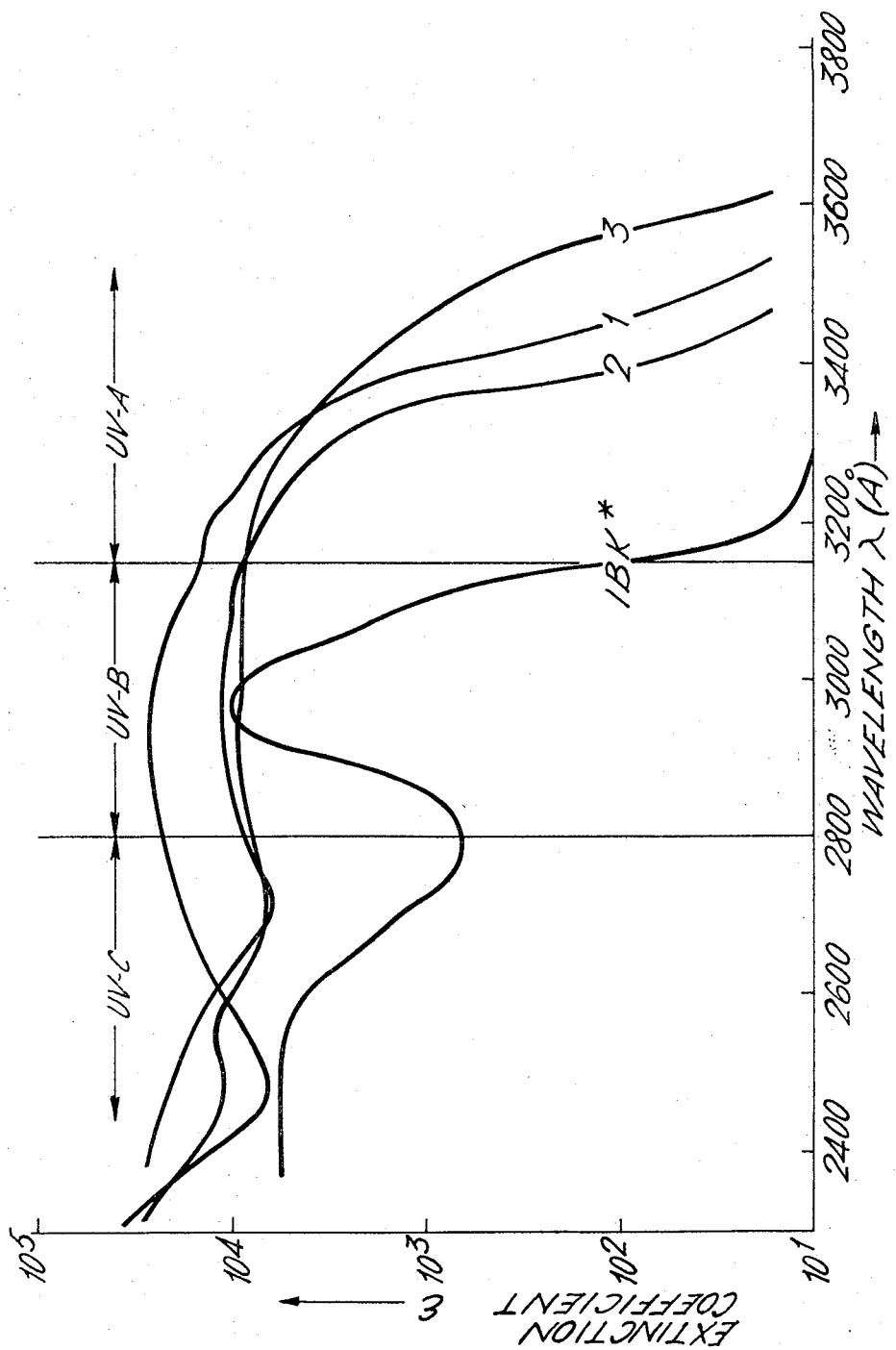
UDO HOPPE
INVENTOR
BY
*Marmorek & Bierman*
ATTORNEY 3,799,969
UREA DERIVATIVES
Udo Hoppe, Hamburg, Germany, assignor to Beiersdorf Aktiengesellschaft
Filed Sept. 1, 1971, Ser. No. 177,085
Int. Cl. C07c 127/16
U.S. Cl. 260—471 R          1 Claim

ABSTRACT OF THE DISCLOSURE

The invention concerns new urea derivatives of the formula:

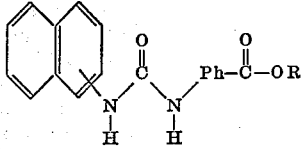

wherein

Ph denotes the ortho-, meta- or para phenylene ring and
R denotes the 2-ethylhexyl-, 2-butyloctyl-, 2-hexyldecyl-, 2-octyldodecyl-, 2-decyltetradecyl-, 2-dodecylcetyl-, 2-isohexyl-isodecyl-, 2-isoheptyl-isoundecyl-, isooctyl-, -isononyl- or butoxyethylenyl group which are particular effective as sunscreens.

---

It is known that short-wave UV radiation in the range of about 2800 to 3200 A. with a maximum of 2970 A. damages human skin through erythema formation, while the longer-wave radiation only tans but does not burn. A good sunscreen substance should, besides an absorption maximum at 2970 A. and an absorption rapidly diminishing in the direction of the longer-wave range, have good skin compatibility, be stable to light and temperature, and be able to be worked into the most diverse cosmetic preparations.

While a number of known sunscreen substances show these properties they have a great drawback in that the said substances do not sufficiently adhere to the skin. They are too quickly washed off by sweat and water which compels the user to apply the sunscreen several times a day.

There have already been described means to filter out rays that are based on p,p'-di-(carboxyphenyl)-ureas.

These have the drawback, however, that their absorption maximum lies at 2850 A., thus is too short-waved to give good protection on the skin.

It was now found that the new alpha-naphthyl urea derivatives of the general formula

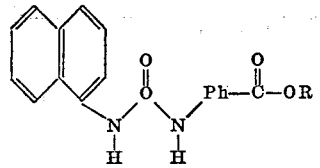

wherein

Ph denotes the ortho-, meta- or para-phenylene ring and
R denotes the 2-ethylhexyl-, 2-butyloctyl-, 2-hexyldecyl-, 2-octyldodecyl-, 2-decyltetradecyl-, 2-dodecylcetyl-, 2 - isohexyl-isodecyl-, 2 - isoheptyl-isoundecyl-, isooctyl-, isononyl- or butoxyethylenyl- group preferably constitute sunscreens which absorb in the optimal range (cf. Table 4 and figure) and are highly compatible.

A further, quite important advantage is the special skin affinity of these substances. Wash-off tests that are described in the following tests demonstrate the excellent adhesion properties of the substances, prepared according to the invention, to the skin and at the same time prove their superiority over diverse conventional sunscreens.

The tests were made on fresh, carefully depilated skin of a pig which in its makeup comes closest to human skin. On a 5 x 15 cm., 0.7 cm. thick skin the substances were applied in amounts of 1 x $10^{-4}$ mol., dissolved in 2 ml. ethanol or paraffin oil (3° Engler at 50° C.). The said amounts were the same as that normally used with a sunscreen. Following that, the skin surface was washed with 100 l. water (13° C.)/hour and the amount of the particular substance remaining on the skin was determined by methanol extraction by extinction measurements against corresponding blank tests. The measurements showed, as seen from Tables 1 through 3, that even after five hours of continuous washing there still remained on the skin sufficient amounts in naphthyl ureas according to the invention to give adequate protection, while the known and customary reference sunscreens p-methoxy cinnamic acid-2-ethylhexyl ester, dipropylene-glycol salicylic ester, p-aminobenzoic acid and p-aminobenzoic acid-2-ethylhexyl ester were washed off after a short time almost completely.

TABLE 1

|  | Decrease of extinction | | | | | |
|---|---|---|---|---|---|---|
|  | Substance I | | Substance II | | Substance III | |
|  | 2,970 A. | 3,070 A. | 2,970 A. | 3,070 A. | 2,970 A. | 3,070 A. |
| Washing time, 100 l. water (13° C.) per hour: | | | | | | |
| 0 hours (percent) | 100 | 100 | 100 | 100 | 100 | 100 |
| 1 hour (percent) | 86 | 84 | 27 | 25 | 41 | 45 |
| 2 hours (percent) | 74 | 73 | 10 | 14 | 20 | 28 |
| 3 hours (percent) | 64 | 62 | 8 | 9 | 12 | 20 |
| 4 hours (percent) | 56 | 55 | 7 | 6 | 9 | 15 |
| 5 hours (percent) | 51 | 49 | 6 | 5 | 6 | 13 |
| 6 hours (percent) | 47 | 46 | 5 | 4 | 5 | 12 |
| Half-value period of affinity (hours) | 5 | 5 | 0.3 | 0.4 | 0.7 | 0.8 |

NOTE.—Substance I=N-1-naphthyl-N'-p-phenylenecarbo-2-octyldodecyloxy-urea; Substance II=p-methoxycinnamic acid-2-ethylhexyl ester; Substance III=Dipropyleneglycol salicylic ester (under addition of some isopropyl myristate).

The substances being dissolved each time in paraffin oil. "Half-value period of affinity" is defined as the time that is required to rinse off of fresh pig skin (of the size 0.3 x 5 x 15 cm.) half of the applied sunscreen substance with water (100 l./h., 13° C.). So defined, Substance I is superior to Substance II by 1430% and to Substance III by 670% relative to their skin affinity.

TABLE 2

| Washing time, 100 l. water (13° C.) per hour: | Decrease of extinction | | | |
|---|---|---|---|---|
| | Substance IV | | Substance V | |
| | 2,970 A. | 3,070 A. | 2,970 A. | 3,070 A. |
| 0 hours (percent) | 100 | 100 | 100 | 100 |
| 0.5 hour (percent) | 93 | 91 | 10 | 21 |
| 1 hour (percent) | 88 | 84 | 1 | 0 |
| 2 hours (percent) | 81 | 77 | 0 | 0 |
| 3 hours (percent) | 76 | 73 | 0 | 0 |
| 4 hours (percent) | 74 | 70 | 0 | 0 |
| 5 hours (percent) | 71 | 67 | 0 | 0 |
| 6 hours (percent) | 68 | 65 | 0 | 0 |
| Ca. 10 hours (percent) | 50 | 50 | 0 | 0 |
| Half-value period of affinity (hours) | 10.0 | 10.0 | 0.125 | 0.175 |

NOTE.—Substance IV=N-1-naphthyl-N'-p-phenylene-carbo-2-ethylhexyloxy-urea; Substance V=p-Aminobenzoic acid.

The substances being dissolved each time in ethanol. In ethanolic application form the Substance IV is superior to Substance V by 6670% relative to their skin affinity.

TABLE 3

| Washing time, 100 l. water (13° C.) per hour: | Decrease of extinction | | | |
|---|---|---|---|---|
| | Substance VI | | Substance VII | |
| | 2,970 A. | 3,070 A. | 2,970 A. | 3,070 A. |
| 0 hours (percent) | 100 | 100 | 100 | 100 |
| 1 hour (percent) | 94 | 92 | 14 | 13 |
| 2 hours (percent) | 86 | 85 | 8 | 6 |
| 3 hours (percent) | 78 | 78 | 4 | 3 |
| 4 hours (percent) | 71 | 71 | 2 | 1 |
| 5 hours (percent) | 63 | 63 | 1 | 0 |
| 6 hours (percent) | 56 | 56 | 0 | 0 |
| Ca. 7 hours (percent) | 50 | 50 | 0 | 0 |
| Half-value period of affinity (hours) | 7.0 | 7.0 | 0.15 | 0.17 |

NOTE.—Substance VI=N-1-Naphthyl-N'-m-phenylene-carbo-2-decyltetradecyl-oxyurea; Substance VII=p-Aminobenzoic acid-2-ethylhexyl ester.

The substances being dissolved each time in paraffin oil. In paraffin oil application from the Substance VI superior to the Substance VII by 4380% relative to their skin affinity.

A further advantage of the urea derivatives according to the invention, especially those with beta-branched alcohol radicals, is that they gel homogeneously with mineral oils in concentrations of 0.2 to 20 percent by weight, preferably 0.4 to 5.0 percent by weight. According to the amount of naphthyl ureas added, gels having a sunscreen effect can be produced in all desired flexibility stages between the values "very soft" and "very firm."

Into these gels other solvents, as well as perfumes, dyestuffs and the like can be worked, as for example isopropyl myristate, vegetable oils, fatty acid esters corresponding to the glandular fat of the rump of waterfowl, wool wax alcohols, polyethylene glycols of various molecular weights, poly-propylene glycols and other alcohols like ethanol, isopropanol, 2-ethyl-hexanol and others, especially alcohols obtainable by the Guerbet reaction (J. Amer. chem. Soc. 76, 52–56 (1954)).

The gel-forming effect of the new substances can also be used for other purposes without utilizing the sunscreening properties. For example, in the thickening of cosmetic preparations or of diverse industrial oils.

Toxicologically, the compounds according to the invention are harmless, as the following examination have shown:

$LD_{50}$ on mice: >10,000 (mg./kg. body weight, perorally);
Toxicity threshold on mice: >10,000 (mg./kg. body weight, perorally); perorally there are no definite poisoning symptons;
Draize test on rabbits: (compatibility on the mucus membrance of the eye): reactionless compatibility on conjunctivae, cornea and iris; no pathological changes;
Patch test on rabbits: (dermal compatibility): on the intact and scarified skin and on the growth of hairs no changes;

There are no general (systemic) incompatibility reactions.

The new urea derivatives are prepared according to known processes.

Preferably, first the esters of the ortho-, meta or para-aminobenzoic acid are prepared by mixing the acid with the three-fold excess of the respective alcohols, diluting with an inert organic solvent like benzene, toluene or xylol and, possibly under addition of one of the usual esterification catalysts, esterifying until the calculated amount of water has separated and the acid number of the mixture is smaller than 1. Following that, the isolated esters are reacted in dry solvents like benzene, toluene or xylol with the corresponding amount of alpha-napthyl-isocyanate with or without a catalyst (for example tin chloride, triethylene diamine, dibutyl tin di-laureate) and they are then obtained after purifying and isolating the N-1-naphthyl-N'-o (m- and p- resp.)-phenylene-carboxy-alkyl-ureas in yields of approximately 70%.

The preparation of the compounds is explained in the following by way of example:

Dimerization of straight-chained alcohols to beta-position branched alcohols (so-called Guerbet reaction, (J. Amer. chem. Soc. 76, 52–56 (1954)).

2-hexyldecanol-(1): In a 500 ml. four-necked flask with stirrer, thermometer, nitrogen inlet tube and water separator with reflux condenser were added to one mol n-octanol in a nitrogen current under stirring 0.175 mol potassium in small portions. After formation of the alcoholate, 1 g. finely-distributed nickel was introduced into the reaction mixture, the speed of agitation increased and heated to boiling until the calculated amount of water (9 ml.) had separated. The temperature then rose within 4 hours to 240° C. (In general, for this particular reaction temperatures of 120–290° C. are required, it being preferable with the lower alcohols to carry out the reaction in the autoclave under a pressure of approximately 100–150 atm. abs.) After cooling to below 100° C., 150 ml. of water were added to the reaction mixture, the catalyst filtered off, the phases separated in a separating funnel, the alcohol layer washed with 10%-aqueous soda lye and the combined aqueous phases extracted with diethyl ether. After separation of the non-aqueous phases, drying over $Na_2SO_4$, drawing off the ether and subsequent distillation in oil pump vacuum a colorless oil was obtained of a $K_{p0.06}$:116° C. (yield: 77% of the theoretical).

Analogously, the other, beta-position branched alcohols were prepared.

Ethylene glycol mono-butyl ether was obtained by addition of equimolar quantities of ethylene oxide to n-butanol according to likewise known prescriptions.

Aminobenzoic esters o-Aminobenzoic acid-2-hexyldecyl-(1)-ester.—In a 2 l. four-necked flask with stirrer, contact thermometer and relay, nitrogen inlet tube and water separator with reflux condenser 242.5 g. (1 mol) 2-hexyldecanol-(1), 68.5 g. (0.5 mol) o-aminobenzoic acid and 1.5 g. of esterification contact in 140 ml. xylol were heated to boiling for 25 hours under nitrogen. The reaction temperature rose slowly to 190° C., 9 ml. water were separated and the acid number dropped to below 1. After sucking off over kieselguhr and distilling in the oil pump vacuum, the excess alcohol being recovered, a light yellow oil of $K_{p\ 0.2}$ 202° C. was obtained (yield: 76% of the theoretical).

Analogously, the other esters of the ortho-aminobenzoic acid and those of the meta- and para-aminobenzoic acids were prepared.

N-1-naphthyl-N'-o(m- and p- resp.)-phenylene-carboxy-alkyl-ureas

N - 1 - naphthyl - N' - o - phenylene-carbo-2-hexyldecyl - oxyl - urea.—79.4 g. (0.22 mol) o - aminobenzoic acid-2-hexyldecyl-(1)-ester were dissolved in 500 ml. dry benzene, mixed with 33.8 g. (9.2 mol) alpha-naphthyl isocyanate and 0.5 g. dibutyl tin dilaureate and boiled 10 hours under reflux until no further isocyanate could be detected. After concentrating, for approximately 1-hour boiling in ethanol under addition of active coal and filtering off the substance crystallized in the form of light-yellow, waxlike crystals of a $F_p$ 65° (yield: 87% of the theoretical).

Analogously, the other naphthyl ureas according to the invention, as listed in Table 4, were obtained.

The figure shows the absorption spectrum of one each of the ortho-, meta- and para-compounds and also the IBK* called standardized absorption process of an ideal sunscreen, as drawn up by the Internationale Beleuchtungskommission (International Illumination Commission).

(International Illumination Commission).

1 is the absorption curve of the N-1-naphthyl-N'-p-phenylene - carbo - 2 - octyldodecyl-oxy-urea, 2 that of the N - 1 - naphthyl - N' - m - phenylene-carbo-2-octyldodecyl-oxy-urea and 3 that of the N-1-naphthyl-N'-o-phenylene-carbo - 2 - octyldodecyl-oxy-urea. UV-A, UV-B and UV-C is the known division of the spectrum, UV-B and UV-C constituting the erythema forming part. The spectra were measured in $5 \cdot 10^{-5}$ m. methanol solution.

TABLE 4

| Compound | Analysis | | | | | | Melting point, ° C. | $\lambda_{max}$. (A.) | $\epsilon$ $\lambda$=2,970 A. | $\epsilon\lambda$=3,070 A. |
|---|---|---|---|---|---|---|---|---|---|---|
| | Calculated | | | Found | | | | | | |
| | C | H | N | C | H | N | | | | |
| N-1-naphthyl-N'-p-phenylenecarbo-2-ethylhexyl-oxy-urea | 74.62 | 7.23 | 6.70 | 74.59 | 7.54 | 6.65 | 129 | 2,965 | 26,000 | 26,000 | 22,200 |
| N-1-naphthyl-N'-p-phenylenecarbo-2-butyloctyl-oxy-urea | 75.91 | 8.07 | 5.90 | 75.94 | 7.70 | 5.92 | 111 | 2,950 | 27,700 | 27,200 | 22,100 |
| N-1-naphthyl-N'-p-phenylenecarbo-2-hexyldecyl-oxy-urea | 76.94 | 8.74 | 5.28 | 77.00 | 8.58 | 5.47 | 91 | 2,960 | 26,200 | 26,200 | 21,000 |
| N-1-naphthyl-N'-p-phenylenecarbo-2-octyldodecyl-oxy-urea | 77.77 | 9.28 | 4.77 | 78.06 | 9.31 | 4.66 | 85 | 2,955 | 25,400 | 25,400 | 20,400 |
| N-1-naphthyl-N'-p-phenylenecarbo-2-decyltetradecyl-oxy-urea | 78.47 | 9.72 | 4.36 | 78.34 | 9.74 | 4.43 | 67 | 2,950 | 28,400 | 27,900 | 22,300 |
| N-1-naphthyl-N'-p-phenylenecarbo-2-dodecylcetyl-oxy-urea | 79.05 | 10.08 | 4.01 | 79.04 | 10.01 | 3.91 | 80 | 2,950 | 26,400 | 25,100 | 20,000 |
| N-1-naphthyl-N'-p-phenylene-carboxy-butoxyethylenyl-urea | 70.91 | 6.45 | 6.94 | 71.14 | 6.61 | 7.03 | 149 | 2,960 | 24,100 | 24,100 | 19,900 |
| N-1-naphthyl-N'-m-pheylene-carbo-2-dodecylcetyl-oxy-urea | 79.05 | 10.08 | 4.01 | 79.18 | 10.10 | 3.90 | 72 | 3,000 | 11,400 | 11,400 | 10,400 |
| N-1-naphthyl-N'-m-phenylene-carboxy-isononyl-urea | 74.95 | 7.45 | 6.48 | 74.61 | 7.35 | 6.44 | 127 | 2,989 | 11,600 | 11,600 | 10,300 |
| N-1-naphthyl-N'-m-phenylene-carbo-2-isohexyl-isodecyl-oxy-urea | 76.94 | 8.74 | 5.28 | 76.81 | 8.83 | 5.31 | 91 | 2,980 | 10,900 | 10,900 | 9,800 |
| N-1-naphthyl-N'-m-phenylene-carbo-2-isoheptyl-isoundecyloxy-urea | 77.37 | 8.81 | 5.01 | 77.65 | 8.95 | 4.86 | 114 | 2,980 | 11,100 | 11,100 | 10,000 |
| N-1-naphthyl-N'-o-phenylene-carbo-2-ethylhexyl-oxy-urea | 74.62 | 7.23 | 6.70 | 74.88 | 7.00 | 6.63 | 109 | ¹ 2,960–3,160 | 11,400 | 11,400 | 11,400 |
| N-1-naphthyl-N'-o-phenylene-carbo-2-butyloctyl-oxy-urea | 75.92 | 8.07 | 5.90 | 76.06 | 7.90 | 6.02 | 68 | ¹ 2,950–3,120 | 10,600 | 10,600 | 10,600 |
| N-1-naphthyl-N'-o-phenylene-carbo-2-hexyldecyl-oxy-urea | 76.94 | 8.74 | 5.28 | 77.06 | 8.56 | 5.29 | 65 | ¹ 2,930–3,150 | 9,900 | 9,900 | 9,900 |
| N-1-naphthyl-N'-o-phenylene-carbo-2-octyldodecyl-oxy-urea | 77.77 | 9.28 | 4.77 | 77.75 | 9.32 | 4.62 | 71 | ¹ 2,930–3,100 | 9,500 | 9,500 | 9,500 |
| N-1-naphthyl-N'-p-phenylene-carboxy-isononyl-urea | 74.95 | 7.45 | 6.48 | 75.12 | 7.35 | 6.37 | 121 | 2,960 | 27,900 | 27,900 | 21,700 |
| N-1-naphthyl-N'-p-phenylene-carbo-2-isohexyl-isodecyl-oxy-urea | 76.94 | 8.74 | 5.28 | 77.21 | 8.63 | 5.38 | 113 | 2,950 | 27,700 | 27,700 | 22,200 |
| N-1-naphthyl-N'-p-phenylene-carbo-2-isoheptyl-isoundecyl-oxy-urea | 77.37 | 8.81 | 5.01 | 77.39 | 8.63 | 5.02 | 114 | 2,950 | 27,800 | 27,800 | 21,700 |
| N-1-naphthyl-N'-m-phenylene-carbo-2-ethylhexyl-oxy-urea | 74.63 | 7.23 | 6.70 | 74.64 | 7.20 | 6.78 | 118 | 2,970 | 12,100 | 12,100 | 10,800 |
| N-1-naphthyl-N'-m-phenylene-carbo-2-butyloctyl-oxy-urea | 75.94 | 8.07 | 5.90 | 76.34 | 7.96 | 6.00 | 107 | 2,980 | 11,500 | 11,500 | 10,500 |
| N-1-naphthyl-N'-m-phenylene-carbo-2-hexyldecyl-oxy-urea | 76.95 | 8.74 | 5.90 | 76.81 | 8.62 | 5.36 | 86 | 3,000 | 11,500 | 11,500 | 10,700 |
| N-1-naphthyl-N'-m-phenylene-carbo-2-octyldodecyl-oxy-urea | 77.75 | 9.27 | 4.77 | 77.66 | 9.38 | 4.84 | 79 | 3,000 | 11,300 | 11,300 | 10,300 |
| N-1-naphthyl-N'-m-phenylene-carbo-2-decyltetradecyl-oxy-urea | 78.47 | 9.72 | 4.36 | 77.65 | 9.57 | 4.73 | 74 | 2,990 | 11,200 | 11,200 | 10,400 |
| N-1-naphthyl-N'-o-phenylene-carbo-2-decyltetradecyl-oxy-urea | 78.47 | 9.72 | 4.36 | 78.60 | 9.69 | 4.43 | 66 | ¹ 2,920–3,110 | 9,600 | 9,600 | 9,600 |
| N-1-naphthyl-N'-o-phenylene-carbo-2-dodecylcetyl-oxy-urea | 79.05 | 10.08 | 4.01 | 78.15 | 10.10 | 3.90 | 55 | 3,000 | 11,400 | 11,400 | 10,400 |
| N-1-naphthyl-N'-o-phenylene-carboxy-isooctyl-urea | 74.61 | 7.23 | 6.69 | 74.71 | 7.14 | 6.63 | 120 | ¹ 2,950–3,165 | 9,800 | 9,800 | 9,800 |
| N-1-naphthyl-N'-o-phenylene-carboxy-isononyl-urea | 74.95 | 7.45 | 6.48 | 74.84 | 7.40 | 6.52 | 117 | ¹ 2,950–3,140 | 9,400 | 9,400 | 9,400 |
| N-1-naphthyl-N'-o-phenylene-carbo-2-isohexyl-isodecyl-oxy-urea | 76.94 | 8.74 | 5.28 | 76.79 | 8.02 | 5.12 | 97 | ¹ 2,890–3,070 | 12,100 | 12,100 | 12,100 |
| N-1-naphthyl-N'-o-phenylene-carbo-2-isoheptyl-isoundecyl-oxy-urea | 77.37 | 8.81 | 5.01 | 77.54 | 8.95 | 5.04 | 120 | ¹ 2,950–3,070 | 12,000 | 12,000 | 12,000 |

¹ Plateau.

The substances according to the invention can be worked separately or in mixture into all the conventionally used cosmetic preparations for sunscreens. In addition, those compounds can be used—which possess similar good sunscreening properties and skin affinity—in which the group R constitutes the crossing products that are obtained by dimerization according to Güerbet from n-alkanol mixtures with 4 to 14 C atoms as well as the beta-naphthyl compounds corresponding to the alpha-naphthyl compounds according to the invention.

It is also possible, e.g. by addition of suitable ointment bases, to make greasing and non-greasing creams or to prepare by mixing with solvents like ethanol, possibly under addition of emulsifiers, liquid sunscreening preparations that can be applied in aerosol form. The gel-forming properties of the compounds can be similarly utilized. In general, concentrations of 3.5–5.5% relative to the total weight of the effective substances, are sufficient for a good light protection.

The following recipes will show possibilities of application by way of example:

1. Sunscreen gel:
    4 g. of N-1-naphthyl-N'-p-phenylene-carbo-2-octyldodecyl-oxy-urea are at 80° C. dissolved in a mixture of:
        88 g. of mineral oil (3° Engler at 50° C.);
        4 g. peanut oil; and
        4 g. of octyl-dodecanol.

At approximately 40° C. perfume is added as described. At room temperature geling sets in; the gel which is obtained remains stable even in the incubator at temperatures above 50° C.

2. Sunscreen gel effective in the long-wave UL range:
    3 g. of N-1-naphthyl-N'-p-phenylene-carbo-2-octyldodecyl-oxy-urea and
    3 g. of N-1-naphthyl-N'-o-phenylene-carbo-2-octyldodecyl-oxy-urea are dissolved at 80° C. in a mixture of:
        86 g. mineral oil (3° Engler at 50° C.); and
        4 g. of isopropyl myristate; and
        4 g. of 2-octyl-dodecanol.

At approximately 40° C., perfume is added as desired. Gelation sets in again at room temperature; the resulting gel stays stable.

3. Soft gel:
    0.5 g. of N-1-naphthyl-N'-p-phenylene-carbo-2-octyldodecyl-oxy-urea, approximately
    0.5 g. of perfume (oil-soluble) and
    99 g. of mineral oil are added together at 80° C. until a homogenous solution has formed.

After cooling to room temperature, a gel is obtained which on rubbing onto the skin disperses.

4. Sunscreening cream:
    15.0 g. of paraffin oil
    2.0 g. of stearic acid or lanolin fatty acid
    2.0 g. of w/o emulsifier
    5.5 of N-1-naphthyl-N'-m-phenylene-carbo-2-decyltetradecyl-oxy-urea
    10.0 g. of vaseline
    5.0 g. of isopropyl myristate and
    9.5 g. of polyethylene glycol of the average MG 1550 (polydiol 550)

are melted together at 80° C. Into this phase are poured with stirring:

41.0 g. of water and
    10.0 g. of glycerin, both of which being previously heated to 80° C, After cold stirring one adds at 32° C. 0.17 g. of perfume; the cream is rolled once.

5. Sunscreen lotion:
    70.0 g. of absolute alcohol
    5.0 g. of isopropylmyristate
    4.5 g. of N-1-naphthyl-N'-o-phenylene-carbo-2-butyloctyl-oxy-urea
    20.5 g. of polyethylene glycol of the average MG 600 (polydiol 600) and
    perfume as desired are dissolved under slight heating.

6. Sunscreen spray:
    2.1 g. of N-1-naphthyl-N'-o-phenylene-carbo-2-butyloctyl-oxy-urea
    1.4 g. of isopropyl myristate
    1.5 g. of peanut oil
    1.0 g. of 2-octyldodecanol
    34.0 g. of absolute ethanol
    perfume as desired.
    60.0 g. of fuel gas 11/12 (50:50)

7. Sunscreen Cream:
    In 40.0 g. of paraffin oil,
    5.0 g. of beeswax and
    2.5 g. of W/O emulsifier are at 80° C.
    4.0 g. of a mixture of the following naphthyl ureas which are obtained when, at the dimerization of the alcohols to the radical R, one starts from a mixture of equal parts of n-octanol and n-decanol, dissolved:
        N-1-naphthyl-N'-p-phenylene-carbo - 2 - hexyldecyl-oxy-urea,
        N-1-naphthyl-N'-p-phenylene-carbo - 2 - octyldodecyl-oxy-urea,
        N-1-naphthyl-N'-p-phenylene - carbo - 2 - octyldecyl-oxy-urea and
        N-1-naphthyl-N'-p-phenylene-carbo - 2 - hexyldodecyl-oxy-urea (mixed melting point: 82° C.)

At 80° C. there are further dissolved 8.3 g. of sorbite in 40.0 g. of water and with stirring these two phases added together. After cold stirring, 0.2 g. of perfume is added at 32° C.; the cream is homogenized.

What is claimed is:

1. Urea derivatives of the formula:

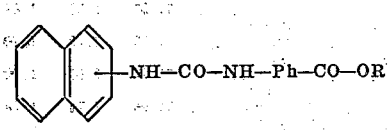

wherein Ph is an ortho-, meta-, or para-combined phenylene ring; and R is a member selected from the group consisting of isooctyl-, isononyl-, butoxy ethylenyl and a beta-position branched alkyl group having 8–28 carbon atoms.

References Cited
UNITED STATES PATENTS
3,660,486   5/1972   Thiele ............ 260—471 R LORRAINE A. WEINBERGER, Primary Examiner
L. A. THAXTON, Assistant Examiner U.S. Cl. X.R.
424—60